(12) United States Patent
Grygorowicz et al.

(10) Patent No.: US 10,391,626 B2
(45) Date of Patent: Aug. 27, 2019

(54) EXOSKELTON TO BE WORN ON THE FRONT AND METHOD FOR USING SUCH AN EXOSKELETON

(71) Applicant: ROBOTIQUES 3 DIMENSIONS, Auxerre (FR)

(72) Inventors: Serge Grygorowicz, Gy l'eveque (FR); Aurélie Riglet, Dammaries sur Loing (FR)

(73) Assignee: ROBOTIQUES 3 DIMENSIONS, Auxerre (FR)

( * ) Notice: Subject to any disclaimer, the term of this patent is extended or adjusted under 35 U.S.C. 154(b) by 123 days.

(21) Appl. No.: 15/113,704

(22) PCT Filed: Jan. 29, 2015

(86) PCT No.: PCT/FR2015/050209
§ 371 (c)(1),
(2) Date: Jul. 22, 2016

(87) PCT Pub. No.: WO2015/114263
PCT Pub. Date: Aug. 6, 2015

(65) Prior Publication Data
US 2017/0001303 A1    Jan. 5, 2017

(30) Foreign Application Priority Data
Jan. 29, 2014    (FR) ...................... 14 50696

(51) Int. Cl.
*B25J 9/00*    (2006.01)
(52) U.S. Cl.
CPC ................... *B25J 9/0006* (2013.01)
(58) Field of Classification Search
CPC combination set(s) only.
See application file for complete search history.

(56) References Cited

U.S. PATENT DOCUMENTS 3,449,769 A * 6/1969 Mizen ..................... A61F 2/54
601/23
3,923,166 A * 12/1975 Fletcher ................... B25J 3/04
414/4

(Continued)

FOREIGN PATENT DOCUMENTS

JP    2007-130234 A    5/2007
WO    2013/106532 A1    7/2013

OTHER PUBLICATIONS

International Search Report dated Apr. 4, 2015, issued in corresponding International Application No. PCT/FR2015/050209, filed Jan. 29, 2015, 2 pages.

(Continued)

*Primary Examiner* — Khoi H Tran
*Assistant Examiner* — Jorge O Peche
(74) *Attorney, Agent, or Firm* — Christensen O'Connor Johnson Kindness PLLC

(57) ABSTRACT

This is a lower limbs exoskeleton and a method whereby a user fitted with such an exoskeleton moves an object. Said exoskeleton comprising two jointed legs designed to be coupled to the lower limbs of a user, and a connecting member joining together the upper end portions of the legs to which it is jointed and which can be positioned in the region of the pelvis of the user. The exoskeleton also comprises means of actuating the jointed legs according to the movements of the user, and a connecting member wholly situated in front of the upper end portions of the jointed legs when considering the direction of walking.

19 Claims, 4 Drawing Sheets

(56) References Cited

U.S. PATENT DOCUMENTS

| | | | | |
|---|---|---|---|---|
| 3,964,182 | A * | 6/1976 | Pomeret | E02F 3/02 37/466 |
| 4,208,028 | A * | 6/1980 | Brown | F16M 13/04 224/185 |
| 4,394,075 | A * | 7/1983 | Brown | F16M 11/2014 224/185 |
| RE32,213 | E * | 7/1986 | Brown | F16M 13/04 248/123.11 |
| 4,957,320 | A * | 9/1990 | Ulrich | B25J 9/102 192/56.1 |
| 5,360,196 | A * | 11/1994 | DiGiulio | F16M 13/04 224/908 |
| 5,435,515 | A * | 7/1995 | DiGiulio | F16M 11/10 224/908 |
| 6,355,335 | B1 * | 3/2002 | Kulkaski | A01D 34/828 428/212 |
| 6,666,796 | B1 * | 12/2003 | MacCready, Jr. | A61F 5/0102 135/65 |
| 6,764,231 | B1 * | 7/2004 | Shubert | F16M 13/04 396/419 |
| 6,923,505 | B2 * | 8/2005 | Siminovitch | A47C 7/54 248/118.1 |
| 7,153,242 | B2 * | 12/2006 | Goffer | A61F 5/0102 482/66 |
| 7,857,774 | B2 * | 12/2010 | Sankai | A61H 3/008 601/35 |
| 8,060,945 | B2 * | 11/2011 | Adarraga | A61F 5/0102 2/22 |
| 8,142,083 | B2 * | 3/2012 | Brown | F16M 11/2035 352/243 |
| 8,147,436 | B2 * | 4/2012 | Agrawal | A63B 22/0235 602/16 |
| 8,152,699 | B1 * | 4/2012 | Ma | A61H 1/0229 482/54 |
| 8,474,672 | B1 * | 7/2013 | Keith | B25J 9/0006 224/576 |
| 8,506,180 | B2 * | 8/2013 | Brown | F16M 13/04 248/187.1 |
| 8,985,878 | B2 * | 3/2015 | Di Leo | G03B 17/563 396/422 |
| 9,095,981 | B2 * | 8/2015 | Brown | A61F 5/01 |
| 9,682,006 | B2 * | 6/2017 | Goldfarb | A61H 3/00 |
| 9,789,023 | B1 * | 10/2017 | Lee | A61H 3/00 |
| 9,808,390 | B2 * | 11/2017 | Caires | A61H 3/00 |
| 9,855,181 | B2 * | 1/2018 | Caires | A61H 1/024 |
| 9,884,421 | B2 * | 2/2018 | Garrett | A61H 1/024 |
| 2003/0004444 | A1 * | 1/2003 | Perner | A61F 5/0102 601/29 |
| 2003/0223844 | A1 * | 12/2003 | Schiele | A61H 1/0274 414/5 |
| 2005/0258210 | A1 * | 11/2005 | Chu | A45F 3/08 224/637 |
| 2005/0279796 | A1 * | 12/2005 | Chu | A45F 3/08 224/637 |
| 2006/0260620 | A1 * | 11/2006 | Kazerooni | A61B 5/1038 128/845 |
| 2006/0276728 | A1 * | 12/2006 | Ashihara | A61F 5/0102 601/5 |
| 2007/0056592 | A1 * | 3/2007 | Angold | A61H 3/00 128/845 |
| 2007/0123997 | A1 * | 5/2007 | Herr | A61F 2/60 623/27 |
| 2007/0241696 | A1 * | 10/2007 | Lauria | B25J 9/102 318/116 |
| 2009/0210093 | A1 * | 8/2009 | Jacobsen | A61H 3/008 700/260 |
| 2010/0059652 | A1 * | 3/2010 | Brown | F16F 1/12 248/585 |
| 2010/0094185 | A1 * | 4/2010 | Amundson | A61F 5/0102 602/16 |
| 2010/0094188 | A1 * | 4/2010 | Goffer | A61H 3/008 602/23 |
| 2010/0254696 | A1 * | 10/2010 | McKay | F16M 13/04 396/420 |
| 2011/0066088 | A1 * | 3/2011 | Little | B25J 9/0006 601/35 |
| 2011/0082566 | A1 * | 4/2011 | Herr | A61F 2/60 623/24 |
| 2011/0164949 | A1 * | 7/2011 | Kim | B25J 9/0006 414/1 |
| 2011/0264014 | A1 * | 10/2011 | Angold | B25J 9/0006 601/35 |
| 2011/0266323 | A1 * | 11/2011 | Kazerooni | B25J 9/0006 224/575 |
| 2011/0295164 | A1 * | 12/2011 | Jacobsen | A61F 2/68 601/23 |
| 2012/0172770 | A1 * | 7/2012 | Almesfer | B25J 9/0006 601/35 |
| 2012/0292361 | A1 * | 11/2012 | Thiruppathi | A45F 3/08 224/576 |
| 2013/0102935 | A1 * | 4/2013 | Kazerooni | A61H 3/00 601/35 |
| 2013/0158445 | A1 * | 6/2013 | Kazerooni | A61H 3/00 601/35 |
| 2013/0197408 | A1 * | 8/2013 | Goldfarb | A61F 5/0102 601/35 |
| 2013/0228602 | A1 * | 9/2013 | Thiruppathi | A45F 3/08 224/625 |
| 2013/0303950 | A1 * | 11/2013 | Angold | B25J 9/0006 601/35 |
| 2014/0064720 | A1 * | 3/2014 | Chapman | F16M 11/10 396/428 |
| 2014/0100493 | A1 * | 4/2014 | Craig | A61H 3/00 601/35 |
| 2014/0121573 | A1 * | 5/2014 | Kazerooni | A61F 5/02 601/23 |
| 2014/0163435 | A1 * | 6/2014 | Yamamoto | A61H 3/00 601/35 |
| 2014/0200491 | A1 * | 7/2014 | Julin | A61H 3/00 601/35 |
| 2014/0212243 | A1 * | 7/2014 | Yagi | A61H 3/00 414/2 |
| 2014/0276261 | A1 * | 9/2014 | Caires | A61H 1/024 601/33 |
| 2014/0276263 | A1 * | 9/2014 | Caires | A61H 3/00 601/34 |
| 2014/0276264 | A1 * | 9/2014 | Caires | A61H 3/00 601/34 |
| 2014/0276265 | A1 * | 9/2014 | Caires | A61H 3/00 601/34 |
| 2014/0366323 | A1 * | 12/2014 | Brown | F16M 11/04 16/322 |
| 2015/0001269 | A1 * | 1/2015 | Sacksteder | B25J 9/0006 224/576 |
| 2015/0016923 | A1 * | 1/2015 | Brown | A61F 5/01 414/1 |
| 2015/0025423 | A1 * | 1/2015 | Caires | A61H 1/024 601/35 |
| 2015/0048134 | A1 * | 2/2015 | Fawcett | F16M 13/04 224/576 |
| 2015/0076196 | A1 * | 3/2015 | Brown | F16M 11/2014 224/271 |
| 2015/0142130 | A1 * | 5/2015 | Goldfarb | A61H 1/024 623/25 |
| 2015/0209214 | A1 * | 7/2015 | Herr | A61H 3/00 623/27 |
| 2015/0289997 | A1 * | 10/2015 | Bosscher | B25J 19/0091 623/24 |
| 2016/0008206 | A1 * | 1/2016 | Devanaboyina | A47C 9/002 601/136 |
| 2016/0031076 | A1 * | 2/2016 | Garrett | A61H 1/024 248/550 |
| 2016/0045386 | A1 * | 2/2016 | Sandler | A61B 5/7415 623/24 |
| 2016/0250093 | A1 * | 9/2016 | Koren | A61F 2/60 623/30 |
| 2016/0270997 | A1 * | 9/2016 | Little | A61H 3/00 |
| 2016/0296345 | A1 * | 10/2016 | Deshpande | A61H 1/0288 |

(56) References Cited

U.S. PATENT DOCUMENTS

| | | | | |
|---|---|---|---|---|
| 2017/0049659 | A1* | 2/2017 | Farris | B25J 9/104 |
| 2017/0071812 | A1* | 3/2017 | Sandler | A61G 5/14 |
| 2017/0143573 | A1* | 5/2017 | Boulanger | A61H 1/0237 |
| 2017/0156895 | A1* | 6/2017 | Song | A61F 2/72 |
| 2017/0281453 | A1* | 10/2017 | Goldfarb | A61H 3/00 |
| 2017/0340504 | A1* | 11/2017 | Sanz Merodio | A61H 1/02 |
| 2018/0049903 | A1* | 2/2018 | Witherspoon | A61H 1/02 |
| 2018/0055712 | A1* | 3/2018 | Gayral | A61H 1/024 |

OTHER PUBLICATIONS

Written Opinion of the International Searching Authority dated Apr. 4, 2015, issued in corresponding International Application No. PCT/FR2015/050209, filed Jan. 29, 2015, 5 pages.

International Preliminary Report on Patentability dated Aug. 2, 2016, issued in corresponding International Application No. PCT/FR2015/050209, filed Jan. 29, 2015, 1 page.

* cited by examiner

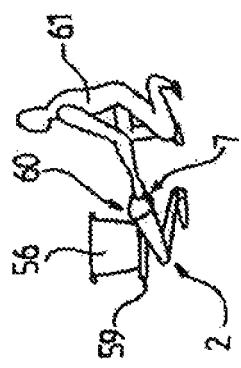
FIG. 6A
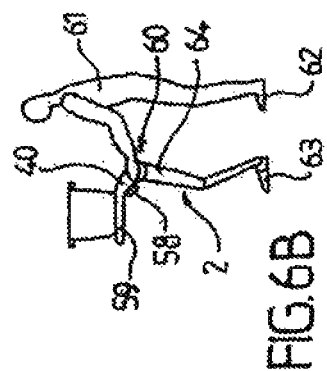
FIG. 6B
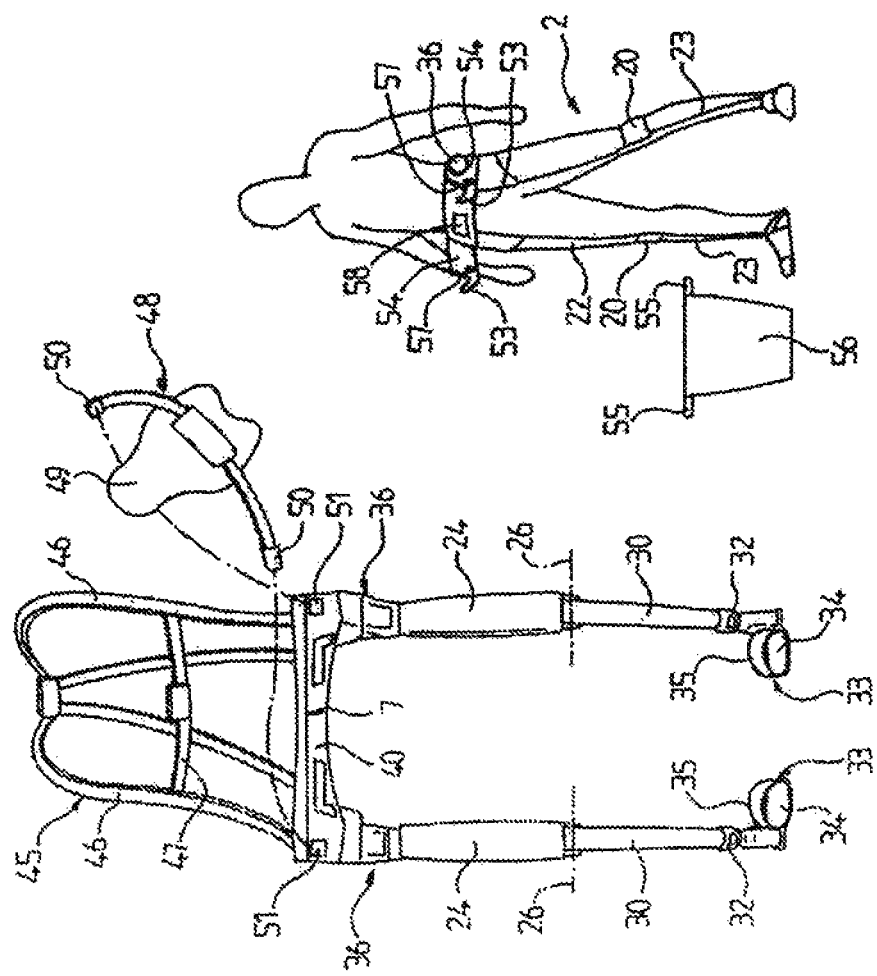
FIG. 5
FIG. 4

EXOSKELTON TO BE WORN ON THE FRONT AND METHOD FOR USING SUCH AN EXOSKELETON

TECHNICAL FIELD

Embodiments of the present disclosure relate to an exoskeleton for the lower limbs, comprising two articulated legs arranged to be coupled to the lower limbs of a user, and a connecting member which is provided between the upper ends of the legs on which it is articulated and which can be positioned in the area of the pelvis of the user.

The disclosure also relates to a method for use of an exoskeleton of the type described above.

It is used particularly advantageously, but not exclusively, in moving heavy loads over short distances (several tens of meters) from a first location to a second location, that is to say in moving loads in excess of 20 kg, for example in excess of 40 kg.

It can be used advantageously in civil engineering, automobile construction and aeronautics, or any other types of industry that necessitate such movements from time to time.

BACKGROUND

At present, when moving a load of more than 50 kg, all the more so when it weighs 75 or 100 kg, over short distances, teams of several persons are used, or lifting machines (lifting truck, crane, etc.).

These means have disadvantages. When they are manual, such manipulations pose health problems for the operators, who risk musculoskeletal disorders.

With lifting machines, apart from the fact that these generally require the presence of two operators, one for lifting the load and the other for guiding it, there are problems relating to the size they take up, preventing their use in confined locations.

Individualized load-carrying aids of the exoskeleton type are also known (WO 2006/078871).

Although such devices allow at least some of the disadvantages of the above-described means to be overcome, they are not truly satisfactory.

This is because they do not permit flexible operations, allowing a heavy load to be easily picked up and put down.

Provided initially for military uses (infantrymen having to cover long distances, for example), they are designed to be worn dorsally, making it possible to take up the load parallel to the user's back, and substantially in line with his spinal column, while freeing the front of the user's body (for handling a firearm, for example).

Moreover, they generally require another person's assistance for placing the loads on the user's back and/or for handling the exoskeleton.

A device is also known with extension of the frame laterally and toward the front, parallel to the user's hips. This is a device of the above type and with the same disadvantages.

An exoskeleton is known (WO 2010/101595 or US 2011/0266323) with a rear lateral bar comprising shoulder straps which are fixed on the bar and which pass forward over the user's shoulders in order to support a suspended tray.

Although more stable, this device still has disadvantages.

This is because it requires counterweights or elements for distributing the forces to the rear of the user.

The user is thus imprisoned to the front and rear by the exoskeleton, which, on the one hand, is detrimental to the speed with which the user can put on the device and, on the other hand, creates a sense of imprisonment for the user, which is harmful in situations of stress or combat.

Finally, exoskeletons are known which seek to protect the user from vertebral and/or muscular problems when lifting loads from the front. The document WO 2013/106532 thus describes a mechanical structure having a front bar with a compensating piston.

The document JP 2007 130234 for its part proposes a system which is affixed to the operator and provided with two articulated arms which are connected by a V-shaped structure to two articulated legs.

In this case, the load taken up by the user's arms is relayed to the user's legs by a V-shaped structure, aided in this by a control unit placed on the user's chest.

It is understood here that the assembly cannot be conceived without the upper part of the exoskeleton situated above the belt (chest and arms particularly) and a central connecting bar between the hips in the same plane.

SUMMARY

The disclosure is based among other things on an idea which runs counter to the practice concerning exoskeletons, in particular (but not exclusively) by accepting a forward overhang taken up uniquely or substantially in the area of the hips or waist of the user and/or in the lower part of the exoskeleton, this being advantageously done in a calculated and continuously verified manner.

To this end, embodiments of the present disclosure aim to make available an exoskeleton and a method of use of such an exoskeleton which respond better than previously known ones to the requirements that arise in practice, especially in that it is limited to the lower part of the human body and will allow the user to handle loads toward the front and in his field of vision, while leaving the user's arms completely free in terms of their movements, with no feeling of suffocation of the user, while at the same time allowing the device to be put on and taken off very easily and quickly, which moreover increases the safety for the user.

No dorsal structure is necessary with the disclosure, which fact allows the user's back to breathe freely, and the user no longer perspires on this side.

In particular, it allows the user to load/unload an object, or "pick and drop" an object, by virtue of the device being able to be worn on the front.

It will also be possible for the exoskeleton to be put on and taken off when already provided with loads, this being done easily and quickly from the rear thereof.

Although reducing the field of vision of the user to the front, the disclosure allows the user a better spatial awareness.

The perception and the efforts of the user are therefore only very slightly different from those he experiences when walking without equipment.

The disclosure also permits greater safety, there being no risk of the load falling and/or of the load collapsing on the user when moved with the exoskeleton.

Finally, with the disclosure, it is no longer necessary to have to readjust the size of the exoskeleton to that of the user.

Indeed, the exoskeleton is not anthropomorphic, and the angle of the knees can be easily adapted, automatically or by a simple control, to the height of the legs, which is an important advantage.

To this end, the disclosure proposes in particular an exoskeleton for the lower limbs, comprising two articulated legs arranged to be coupled to the lower limbs of a user, and a connecting member which is provided between the upper end portions of the legs on which it is articulated and which can be positioned in the area of the pelvis of the user, characterized in that it comprises actuation means for actuating the articulated legs according to the movements of the user, and in that the connecting member is wholly situated in front of the upper end portions of the articulated legs in the direction of walking.

Wholly situated in front of the upper ends of the articulated legs is to be understood as meaning situated in a space placed in front of the articulations of the leg ends articulated with the connecting member.

In advantageous embodiments, recourse is also and/or moreover had to one or more of the following arrangements:

the connecting member comprises a U-shaped or substantially U-shaped transverse connecting branch which is provided between the upper end portions of the legs and takes up the loading forces, and of which the end portions of the lateral parts of the U are articulated respectively on the upper end portions of the legs.

To do this, the transverse branch comprises a central part or bar of the U situated wholly in front of the articulations with the upper end portions of the legs in the horizontal plane, for example at a distance D from the articulation axes of the upper end portions of the legs, for example of between 10 cm and 1 m, for example between 20 cm and 40 cm, for example 25 cm.

The exoskeleton thus completely frees an empty space E for receiving the user, while at the same time generating an overhang.

The transverse connecting branch is thus arranged to be horizontal or substantially horizontal in use;

Advantageously, the member is arranged to bear on or interact with the user's stomach in the operating position.

The connecting member is likewise advantageously openworked in its central part. This allows the user to see the ground between his legs and, more particularly, to better see his feet, including where he is placing them while walking (while using the exoskeleton);

the connecting member comprises a flexible blade arranged to cooperate directly or indirectly with and/or to bear on the stomach of the user, for example by way of a stomach belt passed round the user and rigidly connected to the flexible blade;

the flexible blade for bearing on the stomach is, when at rest, at a distance d of over 30 mm, for example, from the branch. At rest means when the exoskeleton is not being used or in operation. The provision of this distance thus at least in part forms the visual clearance allowing the user to see the ground at his feet;

the legs each comprise a thigh and a shank which are connected by an articulation called a knee joint arranged to permit flexion/extension of the thigh and of the shank, the thighs for their part being connected at the tops to the connecting member by the articulations in the area of the hip, and the actuation means comprise actuating motors in the area of the thighs, in order to actuate the knee joints, and in the area of the connecting member, in order to actuate the articulations in the area of the hip;

the legs of the exoskeleton, in the rest position, have an angle .alpha. (between femoral part and tibial part) of advantageously between 140° and 170°, for example 160°, in the area of the knee joint.

This flexible and advantageously adjustable angulation allows the same exoskeleton to be used for users of different heights.

It also makes it possible to limit or eliminate the overhang of the connecting member, so as to recenter the center of gravity of the member in line with the support polygon of the exoskeleton or substantially with the latter;

the exoskeleton moreover comprises flexible and removable means for connection to the upper part of the body of the user, for example via a system of shoulder straps, the exoskeleton comprises a load-bearing system arranged to bear a load in line with and/or in front of the connecting member, comprising weight detection sensors arranged to transmit information to the actuation means, and computing means for generating, via the actuation means, a torque counter to the weight of the load, and/or the device comprises passive elements arranged to generate a bearing torque between the pelvis and the leg or legs, counter to the torque generated by the determined weight of the load;

the support is adaptable to one or more different weight loads. The support is a horizontal plate, for example;

the exoskeleton comprises a tool system which is able to be manipulated by the user in the upper part, for example fixed removably to the connecting member. Since the exoskeleton can be put on from the rear and is adapted solely with respect to the lower part of the user's body, the user will in fact also be able to use, independently, tools that are easily accessible by his upper limbs, reducing the force of the assembly;

the tool system comprises at least one articulated exoskeleton arm fixed to the connecting member in line with the upper end of one and/or the other of the two legs;

the tool system comprises a video camera;

with the connecting member having lateral ends, the exoskeleton moreover comprises a complementary rigid or semi-rigid dorsal support belt having a central convex support plate, of which the belt ends are arranged to be fixed removably to the lateral ends of the connecting member;

the exoskeleton comprises energy-generating means placed behind the upper end of the thigh and/or connecting member with respect to the direction of walking;

the tool is articulated.

the exoskeleton comprises means for computing, controlling and/or determining its displacement on the basis of the position of its different parts, its movements and the overhang due to the member and to the supported loads.

The disclosure also proposes a method by which an exoskeleton for the lower limbs is used to move one or more objects, the exoskeleton comprising two articulated legs arranged to be coupled to the lower limbs of a user, a connecting member which is provided between the upper ends of the legs on which it is articulated and which can be positioned in the area of the pelvis of the user, characterized in that, with the system comprising actuation means for actuating the articulated legs according to the movements of the user, and with the connecting member being wholly situated in front of the end portions of the articulated legs in the direction of walking, the user controls the actuation means in order to lower the connecting member, loads and/or attaches the one or more objects to be moved onto the connecting bar, controls the actuation means in order to raise the connecting member, with the one or more objects, to a position suitable for walking, puts the exoskeleton on from behind the articulated legs in the direction of walking, fixes the exoskeleton to his height, moves with the exoskeleton loaded with the one or more objects, and controls the actuation means in order to lower the connecting member and unload the one or more objects, before storing away the exoskeleton.

Advantageously, the user exits the exoskeleton before lowering the connecting member provided with the one or more loads.

Also advantageously, the transverse branch of the connecting member is arranged to be horizontal or substantially horizontal during the entire movement of the exoskeleton, at a distance D≥10 cm, for example ≥20 cm, from the articulation axes of the upper end portions of the legs.

The distance D is the distance measured between the articulation axis of the upper portions of the legs with the member and the central and/or axial or median line of the central bar.

In one advantageous embodiment, with the exoskeleton comprising a tool and/or an articulated arm mounted on the connecting member and generating an overhang, the torque generated by the overhang on the exoskeleton is determined, the distance e of the leg, of which the upper end is situated in line with the mounting of the tool and/or arm, in front of the other leg is acquired, it is determined if the distance e of the leg is sufficient to ensure the equilibrium of the exoskeleton calculated as a function of the torque, and an instruction authorizing displacement of the other leg is generated if the distance e is sufficient.

The authorization is, for example, that of the displacement of the arm. It is in fact understood that the authorization will only be given if the leg is sufficiently advanced to manage the torque. If not, the value will be limited or the offset limited.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 4 is a front view of the exoskeleton from FIG. 2, with strap and removable belt for back support.

FIG. 5 is a schematic view of a user provided with an exoskeleton according to another embodiment of the disclosure, intended for carrying a load (a bucket for example) on a hook.

FIGS. 6A and 6B show schematic side views illustrating the first two steps in the use of an exoskeleton of the type in FIG. 1, with a connecting bar respectively lowered for accepting the load and then raised, before being engaged for displacement by the user.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
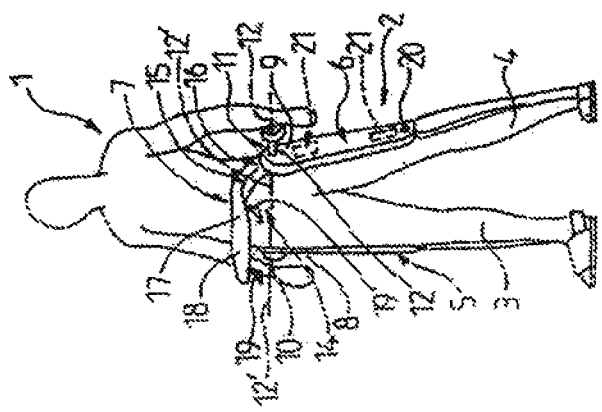
FIG. 1 is a schematic view of an exoskeleton and of its user in accordance with one embodiment of the disclosure.

FIG. 1 is a schematic view showing a user 1 wearing an exoskeleton 2 adapted to his lower limbs 3, 4.

It comprises two articulated legs 5, 6, each arranged to be coupled respectively to the lower limbs of the user by means such as straps (not shown) in the area of the feet and waist, and a connecting member 7 which is provided between the upper ends 8 and 9 of the legs 5, 6 on which it is articulated by way of articulations 10, 11 formed in a manner known per se, on the one hand by parallel or substantially parallel horizontal transverse axles 12, in order to permit flexion/extension of the corresponding leg and, on the other hand, by sagittal axles 12' (horizontal and perpendicular to the transverse axles 12) in order to permit passive abduction/adduction of the hips.

The connecting member 7 is suitable to be positioned in the area of the user's pelvis 14 and is wholly situated in front of the articulated legs in the direction of walking.

It comprises a substantially U-shaped branch 15, of which the end parts or bars 16 are connected to the articulation axles 12, and of which the central bar 17 is situated in front of the user's stomach.

The bar 17 is horizontal and is here provided with a likewise horizontal plate 18, overhanging the support polygon of the user's body, which coincides substantially with that determined by the articulated legs and feet of the exoskeleton.

The plate 18 is arranged to bear the load either from above with retaining means (not shown) (strap for example) or by hooks 19, which are arranged laterally or centrally with respect to the bar 17.

The exoskeleton also comprises articulations 20 which are arranged in the area of the user's knees and which are formed, for example, similarly to the articulations 10, 11 in the area of the hips (horizontal axes), and actuation means 21 for actuating the articulated legs according to the movements of the user, which are indicated schematically by dot-and-dash lines in the FIGURE, and which will be explained in detail below with reference to the embodiment in FIGS. 2 to 4.

In the rest of the description, the same reference numbers will be used to designate identical or similar elements.

Figure 3:
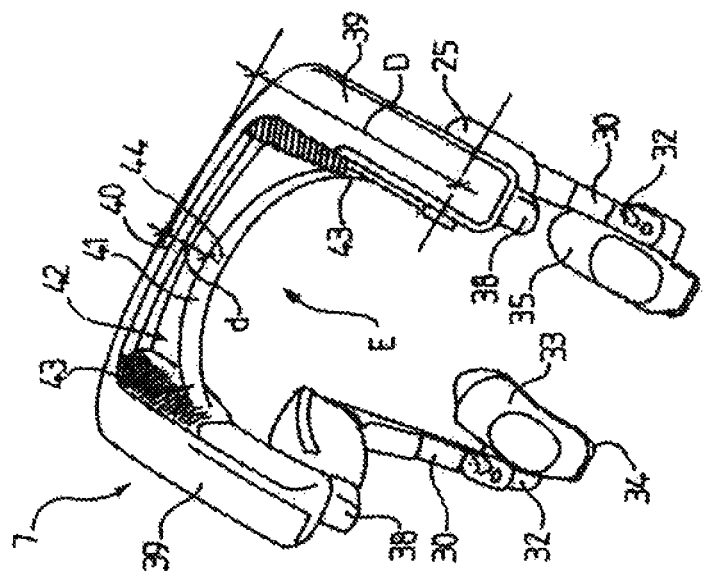
FIG. 3 is a perspective rear view, from above, of the exoskeleton of FIG. 2.
Figure 2:
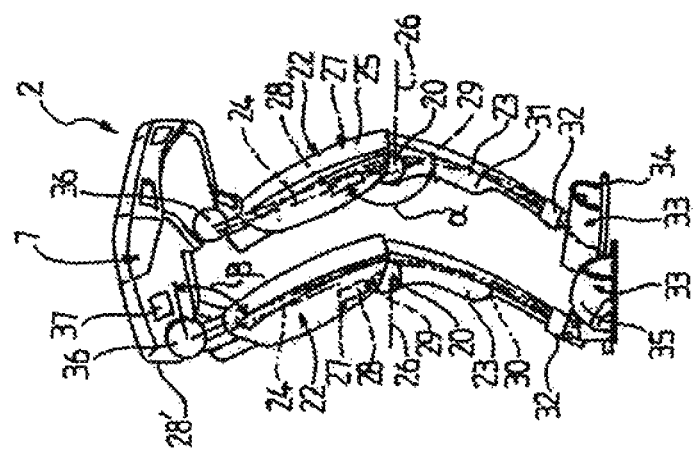
FIG. 2 shows a perspective front view of another embodiment of an exoskeleton according to the disclosure.

We will now describe more precisely with reference to FIGS. 2, 3 and 4 the embodiment of the exoskeleton 2 more particularly described here.

Each leg comprises a thigh 22 and a shank 23 in identical pairs.

The thigh 22 comprises an internal metal tube 24 (dot-and-dash lines in the FIGURE), for example made of titanium, on which is fixed a first cover 25, made of plastic for example.

The first cover 25, elongate and with a substantially trapezoidal longitudinal section in the shape of a human thigh, forms an inner space around the tube 24, in which space the actuation means will be accommodated at least in part.

The thigh is connected to the shank by the articulation 20 called the knee joint, which is arranged to permit flexion/extension of the thigh and of the shank. In this embodiment, part of the knee is enclosed, for example, inside the inner space of the first cover.

The knee joint 20 is, for example, of the type formed by a horizontal axle 26.

When the exoskeleton is at rest, the thigh and the shank form an angle $\alpha$ of greater than 140°, for example 160°.

The actuation means 21 comprise the means 27 for actuation of the knees (in dot-and-dash lines in the FIGURE), which means 27 are, for example, accommodated inside the corresponding first cover 25 and are each respectively formed by an electric motor 28 supplied with direct current from a corresponding removable battery 28' situated on each side on the rear part of the connecting member 7 and/or of the upper part of the thighs 22.

The motor has a power adapted to generate a torque in excess of 100 N·m. It is connected to an actuating piston 29 (broken line in the FIGURE) which is known per se and which is fixed at one end to the tube 24 of the thigh and at the other end to a blade 30 (dot-and-dash line) forming the corresponding shank.

More precisely, and in the embodiment described, the shank 23 is elongate and has a slightly curved shape (for example a radius of curvature of between 1 m and 2 m). It is formed by an inner blade 30, which is sufficiently rigid to take up the load but is likewise sufficiently flexible to act as a shock-absorbing spring, attached at its proximal end to the lower part of the tube 24 via the articulation formed by the axle 26, and attached at its distal end to the foot described below. The shank has a cover 31 for the blade, for example in the form of an open sheath with a U-shaped cross section and a lateral profile designed to respect the esthetics.

The upper part of the cover 31 of the shank interacts with the inner face of the first cover during the rotation of the knee.

The tubes 24 of the thigh and the blades 30 of the shanks are made of titanium, for example, or of any suitable material dimensioned to withstand torques in excess of 400 Newton meter, for example 1,000 N·m.

The lower end of the curved blade 30 is in turn connected in an articulated manner at 32 to a shoe 33 that can be slipped into.

The articulation 32 is of the bi-axial type for flexion/extension and abduction/adduction, in a manner known per se.

The shoe 33 comprises, for example, a supporting spatula 34 for supporting the assembly, and a strap 3b for retaining the user's foot and forming a stirrup with the spatula.

Each leg of the exoskeleton moreover comprises an articulation 36 at the upper end of each thigh, for articulated fixation to the connecting member 7 of the type described with reference to FIG. 1.

This articulation in particular permits a rotation angle .beta., of substantially between 20° and 80°, between the thigh 22 and the connecting member 7, the latter itself also remaining horizontal.

Each leg moreover comprises an actuating motor 37, of the same type as the actuating motors 28 of the knee, in order to actuate the articulations in the area of the hip, placed respectively at the end and fixed to the lateral bars of the U of the connecting member 7.

As has been indicated above, the actuating motors 28 and 37 are supplied leg by leg from the electric batteries 28' which, for example, are respectively fixed to the rear of the upper end of the corresponding thigh with respect to the direction of walking.

In the embodiment described here, the batteries are partly inserted in the first cover 24 and protrude from the cover in the upper part thereof, where they are protected from humidity and impacts by a battery cover 38 inserted partially in the first cover.

The protrusion of the batteries is such that, when the thigh is at a maximum angle, it does not abut the connecting member.

Each battery has a mass of between 3.5 kg and 10 kg.

Here, the transverse branch of the connecting member 7 again has an overall U shape.

It comprises two parallel bars 39, forming the branches of the U, of parallelepipedal shape and partially hollow in order to contain the actuating motors 37 of the hip articulations connected at one side to the upper part of the thighs by the corresponding articulations and at the other side to a transverse central bar 40 formed by a rigid horizontal beam.

The horizontal beam is arranged to be provided with a horizontal plate (not shown), which is removable for example, or with load-bearing hooks (not shown), and it is adaptable to one or more different weight loads.

The member as a whole forms a space E for receiving the user.

The transverse bar 40, being substantially parallelepipedal, is the element for attaching the objects to be transported and is at a distance D, in front of the second articulation, of between 50 cm and 1 m, for example 80 cm.

The overhang thus formed is in particular compensated by the actions of the motors 28 and 37, combined with the angle of the thighs and of the shanks, and with the dimensions of the spatulas 34.

The transverse bar 40 takes up the forces of the loads and, in operation, comes directly or indirectly into contact with the user's stomach.

It moreover comprises one or more through-openings (not shown) which allow the user to partially see the position of the shoes and any imminent obstacles during walking.

However, in the embodiment described here, a rounded blade 41 which is pliable and flexible, but still sufficiently rigid to consolidate the bar and to leave a space 42 for the user to look down through, is interposed between the user's stomach and the transverse branch 40, and each of its ends 43 is fixed to the connecting bar in a rigid manner.

The blade 41 has a concavity toward the user, so as to roughly match the shape of the stomach.

The distance d between the apex 44 of the curve defined by the blade 41 and the transverse branch 40 is greater than 30 mm, for example greater than 50 mm.

The blade 41 makes it possible to spur the forward walking movement, and its distance provides a window through which to view the user's feet.

FIG. 4 shows the exoskeleton 1 with means 45 for connection to the upper part of the user's body, these means being formed, for example, by two parallel shoulder straps 46 fixed to the connecting member 7.

The shoulder straps 46 are rigidly connected to each other by a transverse closure piece 47 with a clip action, in a manner known per se.

The exoskeleton 2 is also and for example, but not necessarily, rigidly connected moreover to the user by a horizontal back support 48 which is formed by a strap opposite the transverse bar 40 and which makes it possible to support the user's back, by moreover comprising a backrest 49 which is substantially parallelepipedal and slightly curved in both transverse directions, in the form of a cyclist's back protector 49 extending along the spinal column. Means 50 are provided for fixing, for example clipping, onto corresponding male or female parts 51, making it possible to enclose the back of the user's body.

In another embodiment (not shown), the exoskeleton 2 is simply connected to the user by a U-shaped back support that can be clipped at the end of its branches onto the rear parts of the connecting member.

The strap is adjustable so as to adapt to the user's build.

FIG. 5 shows an exoskeleton 2 comprising a load-bearing system 52 composed of two upwardly oriented hooks 53.

The hooks 53 are formed, for example, by a V-shaped notch in the lateral bars 54 of the member 7, here once again being U-shaped or substantially U-shaped.

The hooks thus constitute a support for the handles 55 of a bucket 56.

In all the different embodiments, the exoskeleton 2 comprises weight detection sensors 57, which are known per se to a person skilled in the art.

The detection sensors are, for example, piezometric sensors housed in the hooks, with their sensitive detection component at the tip of the V.

They are connected to computing means 58 housed in the member 7 and send information relating to the weight of the load.

The computing means 56 thus generate a command depending on the information received from the sensors and they transmit it simultaneously or almost simultaneously to the actuation means in order to compensate for the load.

To do this, the actuation means generate, on the basis of this information, a torque which is counter to the weight of the load.

In another embodiment, the actuation means comprise passive elements arranged to generate a bearing torque between the pelvis and the leg or legs of the user, counter to the torque generated by the determined weight of the load.

We will now describe, with reference to FIGS. 6A and 6B, a method for using an exoskeleton 2 according to one embodiment of the disclosure.

The exoskeleton 2 comprises a horizontal support plate 59, in the continuation of the horizontal bar 40.

The connecting member 7 comprises means 60 for controlling the actuation means.

These control means are composed of buttons (not shown) which are known per se to a person skilled in the art and are connected to the computing means 58.

The buttons are, for example, positioned in the rear part of the connecting member 7 or on its outer lateral faces.

The user 61 being behind the exoskeleton 1, he takes hold of it and actuates the control means.

These then control the actuation means in order to lower the connecting member 7.

The actuation means then give the instruction to the motors of the knee and of the abdomen to effect a rotation, in such a way as to reduce the angles between, on the one hand, the connecting member and the thigh and, on the other hand, the thigh and the connecting member.

In this way, with the shoes and the connecting member remaining horizontal, the distance between them is reduced.

The user 61 then loads and/or attaches the object 56 or objects to be moved onto the connecting member 7 and/or secures the objects by virtue of straps (not shown).

Once the loading operation has been completed, the user 61 controls the actuation means such that the motors of the knee and of the abdomen effect the rotation opposite to the previous one, that is to say in order to raise the connecting member with the one or more objects to a position suitable for walking.

The user 61 can then easily place his feet 62 in the stirrups 63 of the shoes, by simply slipping his feet into them and closing the belt strap or the dorsal support to engage the exoskeleton 2 from behind the articulated legs 56.

Once the exoskeleton 2 has been put on, the user 61 exerts a displacement by normal walking.

The exoskeleton 2 moreover comprises means 64 for detecting movement of the user, in particular means for angle detection.

These detection means comprise in a manner known per se, and for example, one or more gyroscopes for determining the value of the angle at a given instant, these being coupled to one or more three-directional accelerometers in order to determine the speed and the angular acceleration.

In the embodiment more particularly described here, the detection means likewise comprise a magnetometer, thereby making it possible to deduce, from the measurements of the Earth's magnetic field, the direction of the gravitational field.

The angle detectors are adapted to continuously acquire the angles between the thighs and the shanks of the user's legs and also between the thigh and the hip, this detection being effected at a defined frequency.

The detection means 64 likewise comprise a pressure detector, known per se, for acquiring the pressure of the stomach exerted on the transverse bar and/or on the flexible blade.

Thus:
a concomitant reduction, on each leg, of the angles between the thigh and the shank of the user is analyzed by the computing means 58 as being a command to lower the transverse bar, and a reduction of one of the abdomen/thigh or thigh/shank angles on one of the legs and the detection of a pressure of the stomach greater than a defined threshold is analyzed by the computing means as being a walk command.

These items of information transmitted to the computing means 58 permit the regulation of the motors.

While walking, the user can stoop down and, being then accompanied by the exoskeleton, he can unload/reload and stand up again, once more accompanied by the exoskeleton.

The user can also unload/reload using his arms while remaining standing.

On arrival at the destination, the user 61 again controls the actuation means in order to lower the connecting member 7 and to unload the one or more objects 56.

Since the operations of lowering or raising the exoskeleton 2 can be carried out without the user 61 wearing it, the user is able to exit the exoskeleton 2 before lowering the connecting member 7 provided with the one or more objects.

Figure 7A:
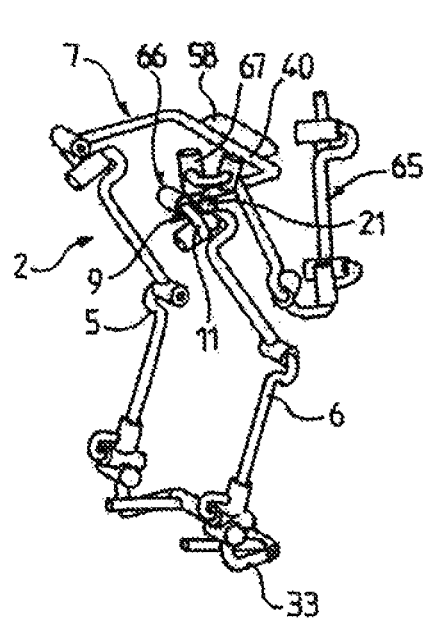
FIGS. 7A and 7B show schematic views of an embodiment of an exoskeleton provided with an articulated arm, with the two legs at the same level and the arm folded up (FIG. 7A), and with one leg in front and the arm unfolded and overhanging to the greatest extent (FIG. 7B).
Figure 7B:
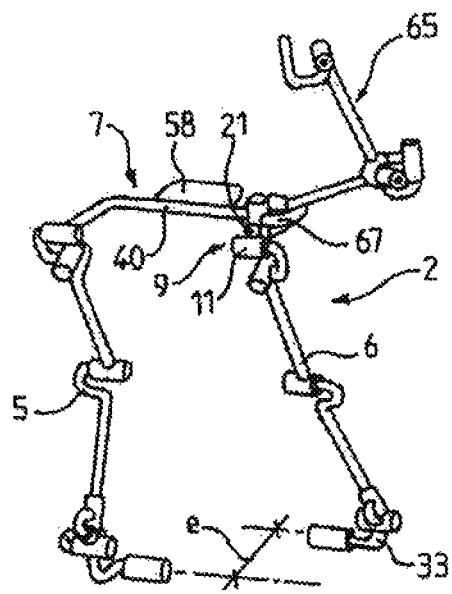

FIGS. 7A and 7B show an exoskeleton provided with an articulated arm 65.

The arm 65 is mounted on the connecting member 7, in line 66 with the upper end 9 of one of the two legs 5, 6.

More precisely, the arm 65 is connected to the exoskeleton 2 by a motorized ball-and-socket joint 67 located above the end 9 of the leg 6, in proximity to the articulation 11.

The arm 65 is itself articulated in a passive or non-passive manner and is, for example, formed in a manner known per se to a person skilled in the art.

More particularly in the embodiment comprising a passive articulated arm, i.e. an arm without its own motorization, the horizontal nature of the connecting member 7 during operation permits a stable reference and a reduction of the overhang.

Keeping the connecting member 7 horizontal permits a fixed reference position for the tools or articulated arms 65 fixed thereto. This therefore makes it possible to remain in a given position at equilibrium (for example off-load) on account of the stiffness of springs, the presence of motor counter-torques, inertias and/or friction.

The fixed and horizontal nature of the member 7 with respect to the direction of the gravitational field thus permit good balancing, with compensation for the mass of the tool, and this is possible for all the operating conditions thereof.

As has been described above, the exoskeleton 2 comprises the computing and control means 58 fixed to the transverse bar 40 of the connecting member 7.

The means 58, also referred to hereinafter by the word computer, determine a control law based in particular on the position of the different parts of the exoskeleton 2, the actions of the user 1, the overhang and the possible disturbances.

This control law effects, when the torque generated by the overhang accentuated by the arm 65 is greater than a certain defined threshold and involves a risk of tilting of the exoskeleton 2, one then determines the distance e between the leg 6, of which the upper end 9 is situated in line with the mounting of the arm 65, and the other leg 5, i.e. the advance of one shoe 33 with respect to the other one.

The computing means 58 integrate the distance e, the model of the exoskeleton 2 and the direction of the gravitational field and determine if the distance e is sufficient to ensure the equilibrium of the exoskeleton 2 calculated as a function of the torque generated by the overhang.

That is to say, the distance e must be sufficient such that the force and/or the displacement of the arm 65 does not generate a torque greater than that of the equilibrium that the exoskeleton is able to support for the distance in question.

If the distance e is sufficient, the computing means 58 generate an authorization instruction and the load can be installed and/or the arm can effect the movement.

More precisely, the control means 60 of the arm 65 are then not limited for the position of the arm 65 in question.

If the distance e is insufficient, then the control means 60 are blocked, i.e. do not transmit the displacement instruction to the arm 65 and/or to the legs 5, 6.

In one embodiment, a siren (not shown) serves, for example, as an acoustic alarm for such a situation and is controlled by the absence of an authorization instruction.

This advance of one shoe 33 with respect to the other is equal to a distance e calculated by the computer and proportional to the torque generated by the overhang.

Figure 8:
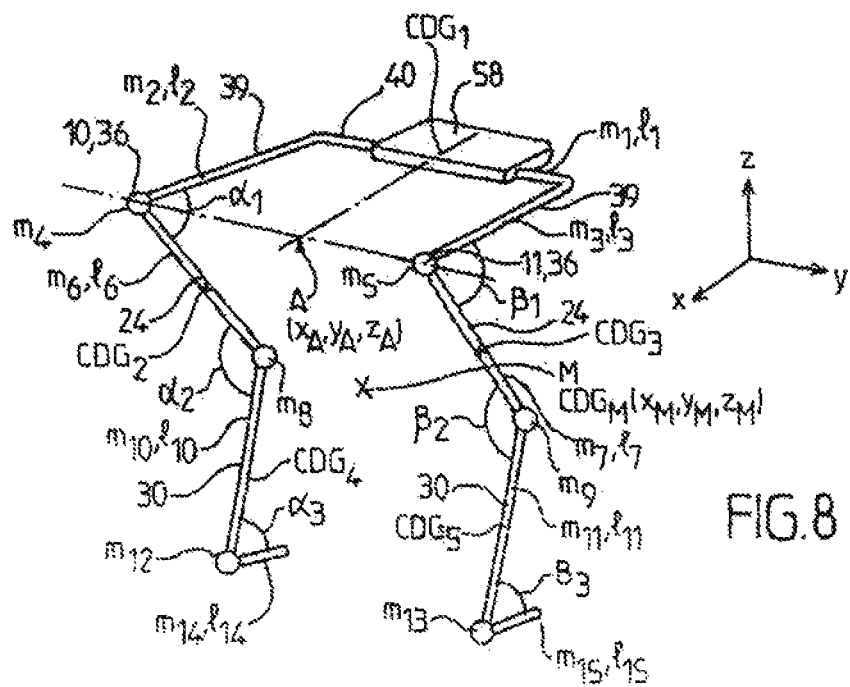
FIG. 8 gives a possible parameterization of an exoskeleton according to the disclosure.

We will now describe, with reference to FIG. 8, a method for establishing the control law governing the different motors 28, 37 of the exoskeleton 2.

The computer 58 comprises a non-volatile memory (not shown). This memory comprises structural parameter values of the exoskeleton 2.

The parameters taken into account are the dimensional parameters (length, mass, position of the centers of gravity, relative angles, etc.) of the different elements of the exoskeleton and in particular the thigh dimensions ($m_6$, $l_6$; $m_9$, $l_9$), shank dimensions ($m_8$, $l_8$; $m_{11}$, $l_{11}$), branches of the connecting member ($m_1$, $l_1$; $m_2$, $l_2$, $m_3$, $l_3$), articulations ($m_4$, $m_5$, $m_7$, $m_{10}$) and spatulas ($m_{14}$, $l_{14}$, $m_{15}$, $l_{15}$).

The computer likewise comprises a virtual reference system with its associated coordinate system, of which the origin A is, for example, at the center of the segment connecting the articulations 11, 12 or 36 to the upper end of each thigh tube 24.

The computer likewise acquires, as parameter, the angles between hip and thigh $\alpha 1$, $\beta 1$, thigh and shank $\alpha 2$, $\beta 2$, shank and shoe $\alpha 3$, $\beta 3$, and also the direction, in the virtual reference system, of the gravitational field.

It then reconstructs a virtual geometric model of the position of the exoskeleton 2, continuously or almost continuously.

Then, proceeding from this model combined with the information on the masses $m_1$ to $m_{11}$ of the different elements of the exoskeleton 2, the computer reconstructs the location of the centers of gravity of the connecting member CDG1, of the thighs CDG2, CDG3, and of the shanks CDG4, CDG5.

The computer then obtains, continuously or almost continuously, a dynamic model of the geometry and of the forces, moments and forces applied to the exoskeleton 2 (acceleration $\gamma i$ in particular), for example by barycentric calculation for a total mass M attached to the general center of gravity CDGM.

On the basis of these data and the data concerning the weight of the loads and/or of the tools or arms 65 and the geometry of their overhang, the computer determines, on the one hand, the commands of the motors for taking up forces and displacements of the legs and, on the other hand and in particular, the threshold torque and thus the distance d of advance of one leg with respect to the other.

Figure 9:
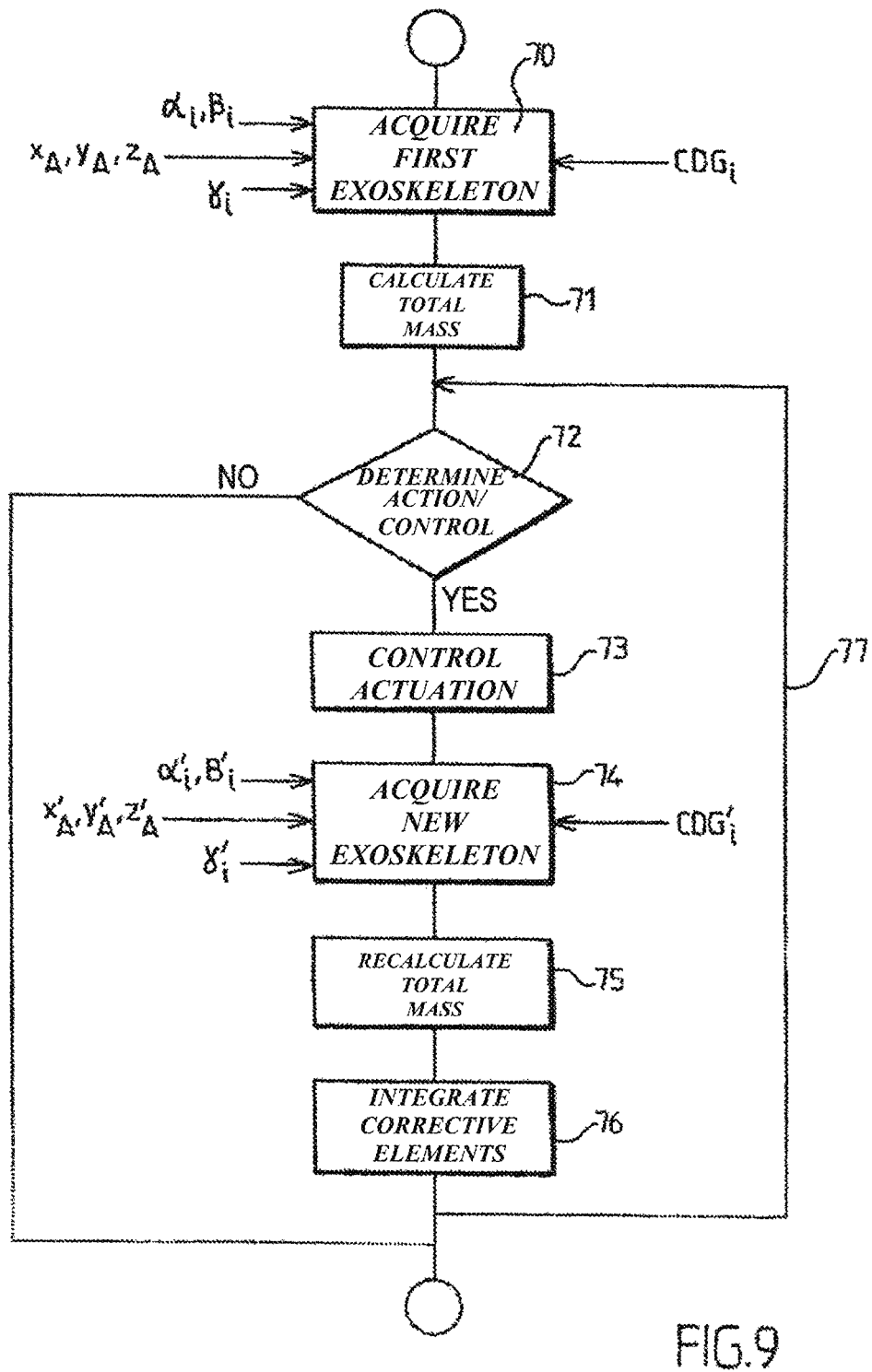
FIG. 9 shows an embodiment of a logic diagram to explain laws governing the control of the function of an exoskeleton according to the disclosure, on the basis of the parameterization in FIG. 8.

More precisely, in operation and with reference to FIG. 9, the exoskeleton 2 operates a first acquisition (step 70) of the parameters direction of the gravitational field $\alpha 1$, $\beta 1$; $x_A$, $y_A$, $z_A$; CDGi $\gamma i$, etc., and deduces (step 2) a geometric and dynamic model of the exoskeleton with computation (step 71) of the total mass M attached at the general center of gravity ($CDG_M$).

The knowledge of the direction of the gravitational field and of the angles $\alpha_i$, $\beta_i$ makes it possible to calculate the contribution of each element of the exoskeleton 2 to the stability and/or to the overhang.

More precisely, the knowledge of the position of the exoskeleton 2 with respect to the direction of the gravitational field makes it possible to refine/correct the control law.

The commands generated by the user 1 determining an acceleration $\gamma i$ of advance of the elements of the exoskeleton 2, noisy or not, calculate the torque exerted by the overhang and compare it to the limit threshold, also calculated, and determine if an action of the control means is required by the user 1 or necessary for the equilibrium of the exoskeleton 2 (step 72).

If this is the case, the actuation means 21 are then controlled (step 73) to exert the necessary counter-torques for the advance of the leg 5, 6 by the calculated distance d.

The computer then performs a new acquisition (step 74) of the parameters with deduction then of a new geometric and dynamic model of the exoskeleton with updated recalculation of the total mass M' attached at the general center of gravity $CDG_M$ (step 75).

The control law then integrates the corrective elements for the equilibrium and instructs the actuation means 21 consequently (step 76).

Steps 72 to 76 are repeated (line 77) as long as the movement or the stability of the exoskeleton is not terminated or ensured.

As will be appreciated, and as is also apparent from the above, the present disclosure is not limited to the embodiments more particularly described. Instead, it includes all variants thereof, in particular those in which the energy used is hydraulic and/or pneumatic rather than electric.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An exoskeleton for the lower limbs, comprising:
   two articulated legs arranged to be coupled to the lower limbs of a user;
   a connecting member which is provided between upper end portions of the legs on which it is articulated and which can be positioned in the area of the pelvis of the user; and
   actuation means for actuating the articulated legs according to the movements of the user,
   wherein the connecting member is articulated by way of first articulations comprising horizontal transverse axes arranged parallel or substantially parallel to one another, the transverse axes permitting flexion/extension of the corresponding leg, and sagittal axes, each arranged horizontal and perpendicular to the transverse axes, the sagittal axes permitting passive abduction/adduction of the user's hips,
   wherein the connecting member is wholly situated in front of the upper end portions of the articulated legs in the direction of walking and is arranged to support a load in forward overhang with regard to the articulated legs,
   wherein the legs each comprise a thigh and a shank which are connected by a knee joint arranged to permit flexion/extension of the thigh and of the shank, the thighs being connected at a top to the connecting member by the first articulations in the area of the hip, and
   wherein the actuation means comprise actuating motors in the area of the thighs, in order to actuate the knee joints, and in the area of the connecting member, in order to actuate the first articulations in the area of the hip, said actuation means being controlled in a calculated and continuously verified manner in order to take up said forward overhang uniquely or substantially in the area of the pelvis of the user.

2. The exoskeleton as claimed in claim 1, wherein the connecting member comprises a U-shaped or substantially U-shaped transverse connecting branch which is provided between the end portions and takes up the loading forces, and of which the ends of the lateral parts of the branch are articulated respectively on the upper end portions of the legs.

3. The exoskeleton as claimed in claim 2, wherein the U-shaped or substantially U-shaped transverse connecting branch comprises a central part, said central part being situated wholly in front of the first articulations at a constant distance D of the user when in place, and at a distance of between 20 cm and 40 cm from the first articulation horizontal transverse axes of the upper end portions of the legs.

4. The exoskeleton as claimed in claim 1, wherein the connecting member is openworked in its central part in order to allow the user to see his feet while using the exoskeleton.

5. The exoskeleton as claimed in claim 1, wherein the connecting member comprises a flexible blade arranged to cooperate directly or indirectly with and/or to bear on the stomach of the user.

6. The exoskeleton as claimed in claim 5, wherein the connecting member being a U-shaped branch, the flexible blade for bearing on the stomach is, when at rest, at a distance of over 30 mm from the U-shaped branch.

7. The exoskeleton as claimed in claim 1, wherein the articulated legs, in a rest position, have an angle $\alpha$ between the thigh and the shank of between 140° and 170° at the knee joint.

8. The exoskeleton as claimed in claim 1, comprising flexible and removable means for connection to the upper part of the body of the user.

9. The exoskeleton as claimed in claim 1, comprising a load-bearing system arranged to bear a load in line with and/or in front of the connecting member, comprising weight detection sensors arranged to transmit information to the actuation means, and computing means for generating, via said actuation means, a torque counter to the weight of the load, and/or in that it comprises passive elements arranged to generate a bearing torque between the pelvis and the leg or legs, counter to the torque generated by said determined weight of the load.

10. The exoskeleton as claimed in claim 1, comprising a tool system which is able to be manipulated by the user in the upper part and which is fixed removably to the connecting member.

11. The exoskeleton as claimed in claim 10, wherein the tool system comprises at least one articulated arm fixed to the connecting member in line with the upper end of one and/or the other of the two legs.

12. The exoskeleton as claimed in claim 1, wherein, with the connecting member having lateral ends, the exoskeleton comprises a complementary rigid or semi-rigid dorsal support belt having a central convex support plate, of which the belt ends are arranged to be fixed removably to said lateral ends of the connecting member.

13. The exoskeleton as claimed in claim 1, comprising energy-generating means placed behind the upper end of the thigh and/or the connecting member with respect to the direction of walking.

14. The exoskeleton as claimed in claim 1, comprising means for computing and controlling its displacement on the basis of the position of its different parts, its movements and the overhang due to the member and to the supported loads.

15. A method by which an object is moved by a user equipped with an exoskeleton for the lower limbs, comprising two articulated legs arranged to be coupled to the lower limbs of a user, a connecting member which is provided between the upper ends of the legs on which it is articulated and which can be positioned in the area of the pelvis of the user, the connecting member being articulated by way of first articulations comprising horizontal transverse axles arranged parallel or substantially parallel to one another, the transverse axles configured to permit flexion/extension of the corresponding leg, and sagittal axles, each arranged horizontal and perpendicular to the transverse axles, the sagittal axles configured to permit passive abduction/adduction of the user's hips, the exoskeleton comprising actuation means for actuating the articulated legs according to the movements of the user, and with the connecting member, said connecting member being wholly situated in front of the upper end portions of the articulated legs in the direction of walking and arranged to support a load in forward overhang with regard to the articulated legs, each leg comprising a thigh and a shank which are connected by a knee joint arranged to permit flexion/extension of the thigh and of the shank, the thighs connected at a top to the connecting member by said first articulations in the area of the hip, and the actuation means comprising actuating motors in the area of the thighs, in order to actuate the knee joints, and in the area of the connecting member, in order to actuate the first articulations in the area of the hip, the method comprising the following steps:

controlling the actuation means in order to lower the connecting member;

loading or attaching the object or objects to be moved onto the connecting bar;

controlling the actuation means in order to raise the connecting member, with the one or more objects, to a position suitable for walking;

donning the exoskeleton from behind the articulated legs;

fixing the exoskeleton to the height of the user; and then walking and/or displacing with the exoskeleton said objects toward a predetermined place, while controlling the actuation means in a calculated and continuously verified manner in order to take up said forward overhang uniquely or substantially in the area of the pelvis of the user during the movement;

lowering the connecting member and unloading the one or more objects at said predetermined place.

16. The method as claimed in claim 15, wherein the user exits the exoskeleton before lowering the connecting member provided with the one or more objects.

17. The method as claimed in claim 15, wherein the connecting member comprising a transverse branch, said transverse branch of the connecting member is arranged to be horizontal or substantially horizontal during the entire movement of the exoskeleton, at a distance D≥10 cm from the articulation axes of the upper end portions of the legs.

18. The method as claimed in claim 15, wherein, with the exoskeleton comprising a tool and/or articulated arm mounted on the connecting member and generating an overhang, the method further comprising determining the torque generated by said overhang on the exoskeleton, if said torque is greater than a determined threshold value, acquiring a distance of the leg, of which the upper end is situated in line with the mounting of said tool and/or arm, in front of the other leg, determining if the distance of said leg is sufficient to ensure the equilibrium of the exoskeleton calculated as a function of said torque, and generating an instruction authorizing displacement of the other leg if the distance is sufficient.

19. An exoskeleton for the lower limbs, comprising:

two articulated legs arranged to be coupled to the lower limbs of a user; wherein the legs each comprise a thigh and a shank which are connected by a knee joint arranged to permit flexion/extension of the thigh and of the shank;

a connecting member provided between upper end portions of the legs on which it is articulated and positionable in the area of the pelvis of the user, wherein the connecting member is articulated by way of first articulations comprising horizontal transverse axles arranged parallel or substantially parallel to each other, the transverse axles configured to permit flexion/extension of the corresponding leg, and sagittal axles, each arranged horizontal and perpendicular to the transverse axles, the sagittal axles configured to permit passive abduction/adduction of the user's hips, the connecting member being wholly situated in front of the upper end portions of the articulated legs in the direction of walking and is arranged to support a load in forward overhang with regard to the articulated legs, wherein the thighs are connected at a top to the connecting member by the first articulations in the area of the hip; and an actuator configured to actuate the articulated legs according to the movements of the user, the actuator comprising actuating motors in the area of the thighs, in order to actuate the knee joints, and in the area of the connecting member, in order to actuate the first articulations in the area of the hip, wherein the actuator is controlled in a calculated and continuously verified manner in order to take up said forward overhang uniquely or substantially in the area of the pelvis of the user.

* * * * *